(12) United States Patent
Inaguma et al.

(10) Patent No.: US 6,216,815 B1
(45) Date of Patent: Apr. 17, 2001

(54) POWER STEERING APPARATUS

(75) Inventors: Yoshiharu Inaguma, Nagoya; Kazuya Ando, Okazaki, both of (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 0 days.

(21) Appl. No.: 09/262,316

(22) Filed: Mar. 4, 1999

(30) Foreign Application Priority Data

Mar. 5, 1998 (JP) .................................................. 10-073341

(51) Int. Cl.[7] ........................................................ B62D 5/10
(52) U.S. Cl. ............................ 180/441; 180/442; 60/468
(58) Field of Search ................................ 60/468; 91/437; 180/417, 421, 422, 439, 441, 442

(56) References Cited

U.S. PATENT DOCUMENTS

| | | | |
|---|---|---|---|
| 4,476,529 | 10/1984 | Nakamura et al. . | |
| 4,553,390 | * 11/1985 | Liebert et al. | .......................... 60/384 |
| 4,784,041 | * 11/1988 | Lang | ....................... 91/371 |
| 5,072,584 | * 12/1991 | Mauch et al. | .......................... 60/378 |
| 5,121,807 | * 6/1992 | Adams . | |
| 5,372,214 | 12/1994 | Haga et al. . | |
| 5,558,177 | 9/1996 | Inaguma et al. . | |
| 5,758,740 | * 6/1998 | Park | ..................... 180/442 |
| 5,809,781 | * 9/1998 | Krantz | ..................... 60/489 |

FOREIGN PATENT DOCUMENTS

| | | |
|---|---|---|
| 2931240 | * 2/1981 | (DE) . |
| 58-47657 | 3/1983 | (JP) . |
| 1-33424 | 10/1989 | (JP) . |
| 5-338549 | 12/1993 | (JP) . |

OTHER PUBLICATIONS

Yoshiharu Inaguma, et al., "Energy Saving in an Electro–Hydraulic Power Steering (EHPS) System", Toyoda Koki Technical Review, vol. 37, No. 1, Jul. (1996), pp. 1–12.

* cited by examiner

Primary Examiner—Brian L. Johnson
Assistant Examiner—Avraham H. Lerner
(74) Attorney, Agent, or Firm—Oblon, Spivak, McClelland, Maier & Neustadt, P.C.

(57) ABSTRACT

A power steering apparatus, including a pump, a power cylinder, a control valve and a switching valve. The switching valve is for connecting the cylinder chambers in accordance with pressure change of the operating fluid responsive to operation of the control valve in order to return the steering wheel toward a neutral position. When the rotation of the steering wheel is substantially stopped, the switching valve reacts to the pressure change in order to connect the cylinder chambers, so as that the higher hydraulic pressure of one of the cylinder chamber releases to the other. This hydraulic pressure releasing of the operating fluid returns the power piston toward the neural position, smoothly. The steering wheel also returns toward the neutral position in accordance with the return of the cylinder piston, so as that restoring force of the steering wheel is enhanced.

13 Claims, 6 Drawing Sheets

POWER STEERING APPARATUS

BACKGROUND OF THE INVENTION

1. Field of the Invention

The present invention relates to a hydraulic power steering apparatus.

2. Description of the Related Art

Hydraulic power steering apparatuses have been proposed for assisting steering operation of vehicles and the like. In general, the conventional hydraulic power steering apparatus mainly consists of a pump 50, a reservoir 90, a rotary control valve 10 and a power cylinder 30, as shown in FIG. 1. The pump 50 is for supplying operating fluid for producing assist power in the steering operation of a driver. The reservoir 90 is for storage of the operating fluid. The rotary control valve 10 locates between the pump 50 and the reservoir 90, and controls the operating fluid in accordance with the steering operation. The power cylinder 30 works in response to the operating fluid controlled by the rotary control valve 10.

The rotary control valve 10 adopts a center-closed-type for giving the driver steady steering feeling in the vicinity of the neutral position of the steering wheel (refer to FIG. 2). The center-closed-type of the rotary control valve 10 substantially closes an inlet port 10a leading the operating fluid from the pump 50 in the vicinity of the neutral position of the steering wheel to prevent the operating fluid for the power cylinder 30. Since difference pressure in the power cylinder 30 is maintained to be extremely low or substantially zero in the vicinity of the neutral position, the steering feeling becomes similar to that of a non-assisted steering apparatus. Therefore, the power steering apparatus is able to give the driver steady steering feeling in the vicinity of the neutral position of the steering wheel, i.e., rigidity of the neutral position is enhanced.

However, the inventors found that the power steering apparatus with the center-closed-type rotary control valve 10 is inferior to that with a center-open-type rotary control valve 10' shown in FIG. 3 in self-return of the steering wheel to the neutral position thereof. The self-return of the steering wheel is a restoring rotation of the steering wheel caused by reaction force from wheels, i.e., self-aligning-torque, so as that the steering wheel automatically returns to the neutral position after the driver stops turning the steering wheel.

The center-open-type rotary control valve 10' shown in FIG. 3 opens an inlet port 10a', cylinder ports 10b' and return ports 10c' in the neutral position thereof. This configuration allows two discharging passages A' and B' in each of the cylinder port 10b' to release the operating fluid under the self-return of the steering wheel. When the steering wheel returns to the neutral position, i.e., the self-return starts, a displaced power piston 330' returns to the neutral position of the power cylinder 30'. For example, the power piston 330' shown by broken lines moves to the neutral position shown by solid lines. The moving power piston 330' discharges the operating fluid from a left-side cylinder chamber to the left-side cylinder port 10b' (refer to a broken arrow line of FIG. 3). Under this state, the operating fluid is discharged from the passages A' and B' in the cylinder port 10b'.

On the other hand, the center-closed-type rotary control valve 10 shown in FIG. 2 closes the inlet port 10a in the neutral position thereof. This configuration allows only one discharging passage A in each of a cylinder port 10b to release the operating fluid under the self-return of the steering wheel. When the steering wheel returns to the neutral position, a displaced power piston 330 returns to the neutral position of the power cylinder 30. For example, the power piston 330 shown by broken lines moves to the neutral position shown by solid lines so as to discharge the operating fluid from a left-side cylinder chamber to the left-side cylinder port 10b (refer to a broken arrow line of FIG. 2). Under this state, the operating fluid is discharged from the passage A in the cylinder port 10b.

Therefore, the center-closed-type rotary control valve 10 substantially has a half of area for discharging the operating fluid compared with the center-open-type rotary control valve 10'. This structural difference gives the center-closed-type rotary control valve 10 the sluggish self-return of the steering wheel.

SUMMARY OF THE INVENTION

Accordingly, the present invention is directed to provide an improved hydraulic power steering apparatus capable of giving smooth self-return of a steering wheel.

Briefly, this and other objects of this invention as hereinafter will become more readily apparent as having been attained broadly by a power steering apparatus, including a pump, a power cylinder, a control valve and a switching valve.

The pump is for discharging operating fluid. The power cylinder has two cylinder chambers divided by a power piston. The control valve is for regulating the operating fluid supplied to the power cylinder in accordance with rotation of a steering wheel. The switching valve is for connecting the cylinder chambers in accordance with pressure change of the operating fluid responsive to operation of the control valve in order to return the steering wheel toward a neutral position.

In the power steering apparatus, when the steering wheel is rotated by a driver, the control valve supplies the operating fluid discharged from the pump to the power cylinder. In this state, the switching valve disconnects the cylinder chambers, so as that hydraulic pressure acts on the power piston of the power cylinder to assist the steering operation.

When the rotation of the steering wheel is substantially stopped, the power piston returns toward the neutral position of the power cylinder by reaction force from wheels, i.e., self-aligning-torque. In this state, the switching valve reacts to the pressure change of the operating fluid in order to connect the cylinder chambers, so as that the higher hydraulic pressure of one of the cylinder chamber releases to the other. This hydraulic pressure releasing of the operating fluid smoothly returns the power piston toward the neural position. As a result, the steering wheel also returns toward the neutral position thereof in accordance with the return of the cylinder piston, so as that restoring force of the steering wheel is enhanced. Therefore, the power steering apparatus provides the smooth self-return of steering wheel with no costly electric device to help the self-return.

It is a preferable feature of the invention that the control valve includes a center-closed-type variable orifice for preventing the operating fluid supply to the power cylinder in vicinity of the neutral position of the steering wheel.

Sine the center-closed-type control valve prevents supplying the operating fluid to the power cylinder in vicinity of the neutral position, the power steering apparatus does not assist the steering operation in vicinity of the neutral position. This means that steering feeling of the driver is similar to that of the manual steering apparatus, so as that rigidity, i.e., strength of stability, of the steering operation is enhanced around neutral position. Therefore, directional stability of the vehicle is also enhanced.

Namely, the power steering apparatus copes with both enhancements that restoring force for self-return of the steering wheel and the rigidity of the steering operation around neutral position.

It is another preferable feature of the invention that the switching valve has a spool moving in accordance with differential pressure between discharge pressure of the pump and higher pressure of the cylinder chambers.

When the steering wheel is rotated by a driver, the differential pressure is relatively small, so as that the switching valve maintains the disconnection between the cylinder chambers. When the steering wheel is stopped, the control valve returns to its neutral position. Since the center-closed-type control valve prevents supplying the operating fluid to the power cylinder, the differential pressure rises. When the differential pressure exceeds a predetermined amount, the switching valve connects the cylinder chambers. As described above, since the switching valve is responsive to the differential pressure, the power steering apparatus does not require costly device such as an encoder or a solenoid. Therefore, the power steering apparatus is inexpensive.

It is a further preferable feature of the invention that the pump is driven by an electric motor operating in accordance with the differential pressure between the discharge pressure of the pump and the higher pressure of the cylinder chambers.

In this feature, the discharge fluid rate is easily controlled according to needs of power-assist by changing the rotational speed of the electric motor. Therefore, it is able to reduce the energy consumption. When the power-assist is required under the steering operation, the rotational speed of the pump increases in accordance with the reduction of the differential pressure between the discharge pressure of the pump and the higher pressure of the cylinder chambers.

On the other hand, When the power-assist is essentially not required under the non-steering operation, the rotational speed of the pump decreases to maintain the discharge flow rate extremely low or the pump stops in accordance with the increase of the differential pressure for the energy saving.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

An embodiment of the present invention is described with reference to the accompanying drawings FIGS. 4 to 7.

Figure 1:
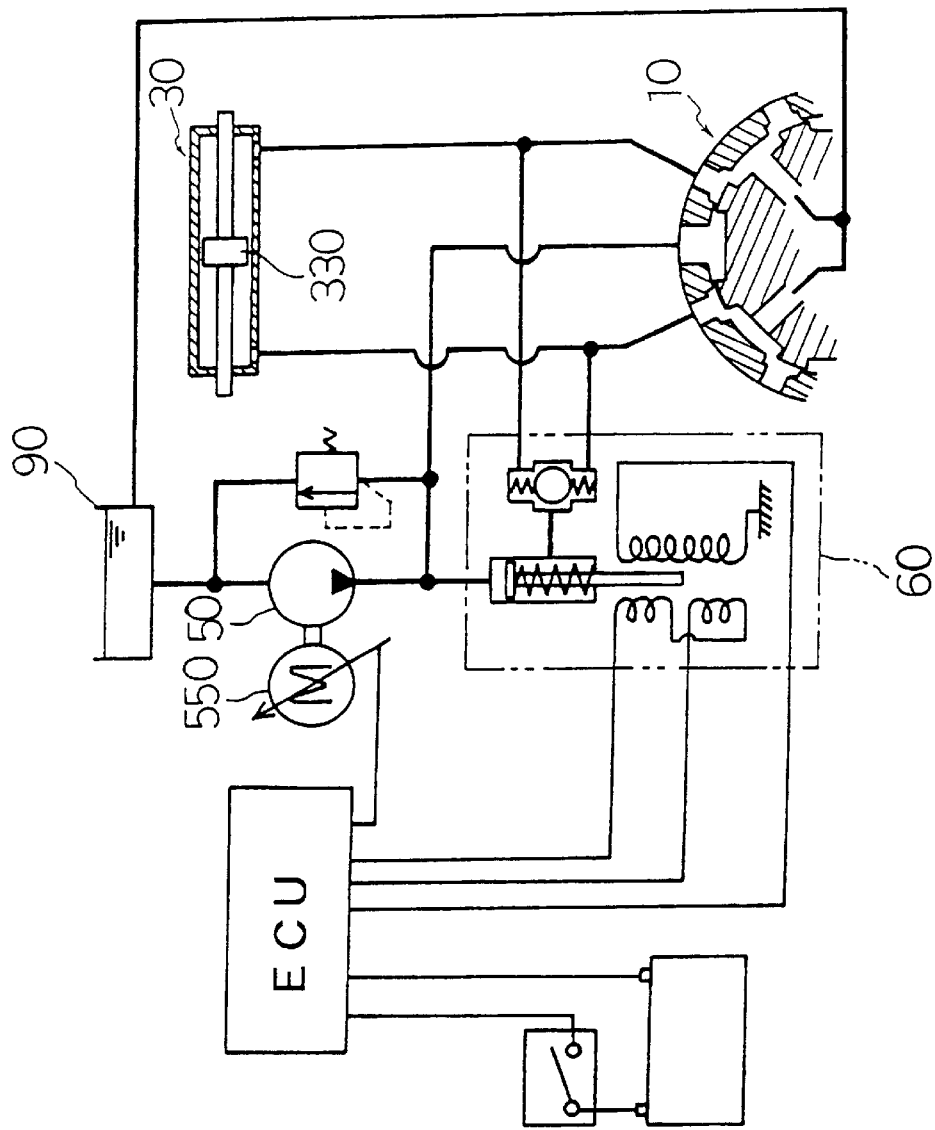
FIG. 1 is a diagram showing a conventional power steering apparatus.
Figure 2:
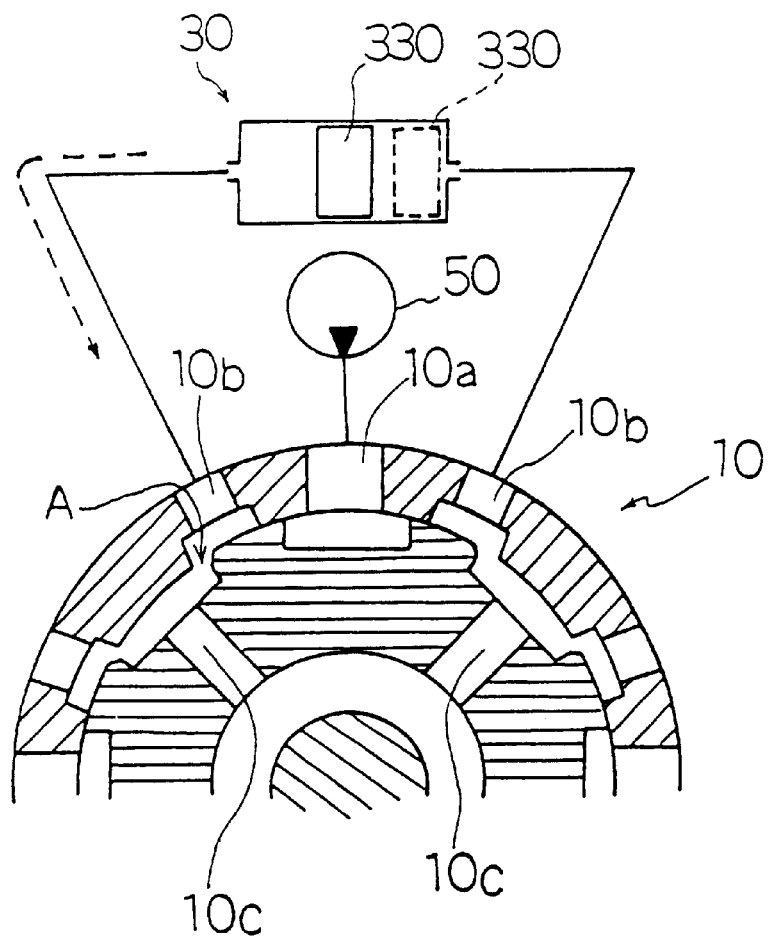
FIG. 2 is a transverse sectional view showing a conventional center-closed-type rotary control valve.
Figure 3:
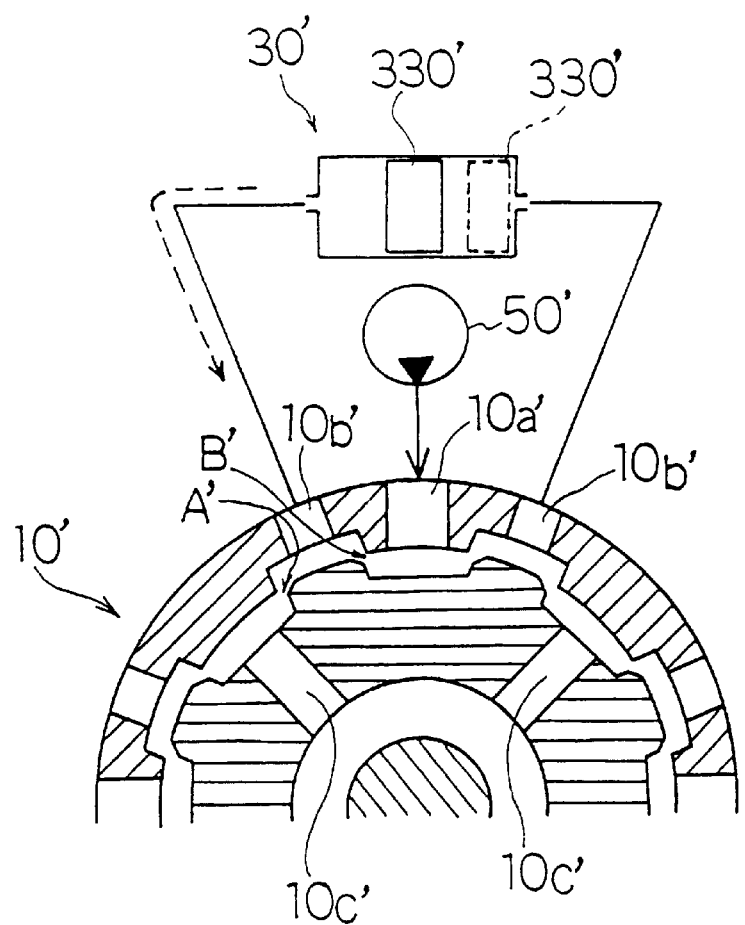
FIG. 3 is a transverse sectional view showing a conventional center-open-type rotary control valve.
Figure 4:
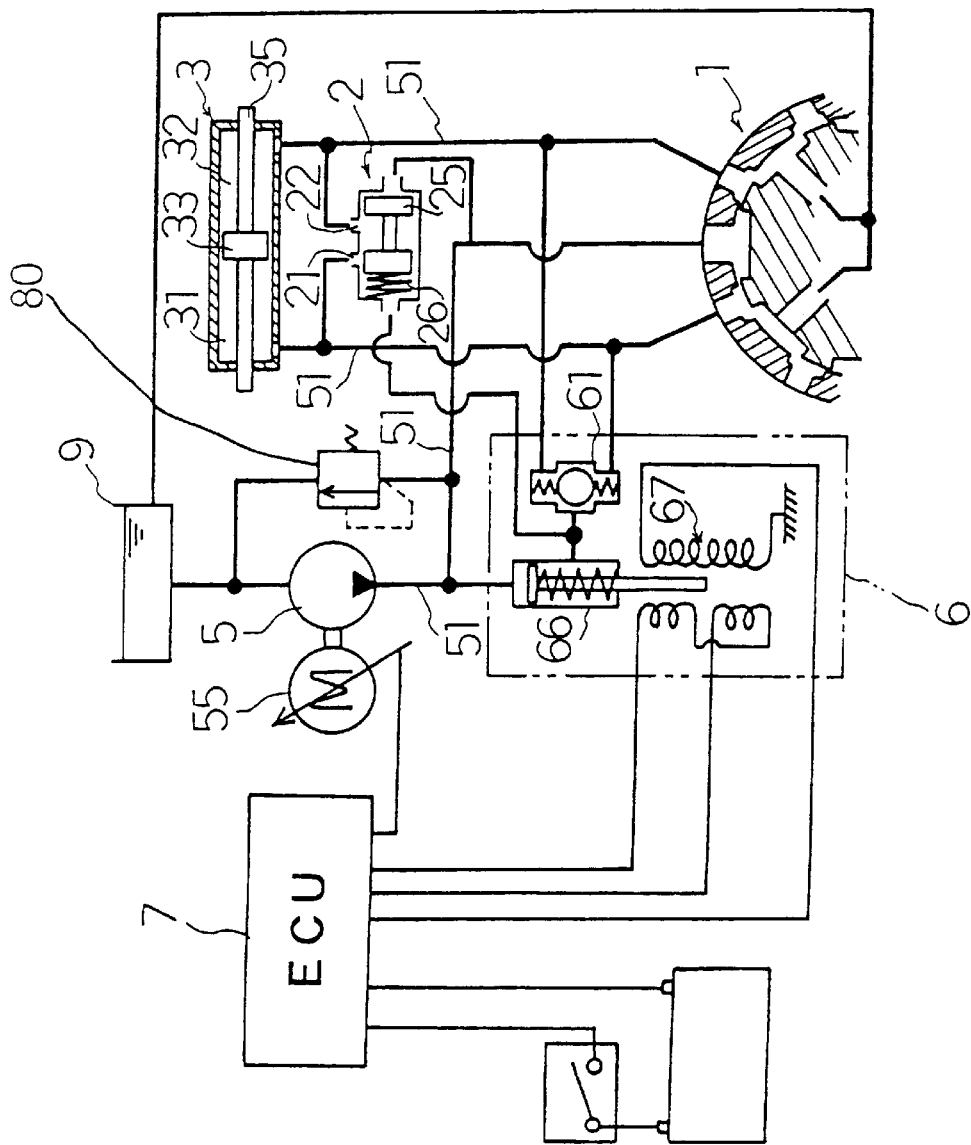
FIG. 4 is a diagram showing a power steering apparatus according to an embodiment of the present invention.

As shown in FIG. 4, a hydraulic power steering apparatus of the embodiment is mainly composed of a pump 5, an electric motor 55, a supply passage 51, a control valve 1, a power cylinder 3, a differential pressure detecting device 6, a switching valve 2 and an electric control unit 7.

The pump 5, e.g., a vane pump, discharges operating fluid. The electric motor 55 drives the pump 5. The operating fluid discharged by the pump 5 leads to the control valve 1 and the power cylinder 3 via the supply passage 51. The control valve 1, e.g., a rotary control valve, operates in accordance with rotation of a steering wheel not illustrated, and regulates the flow of the operating fluid. The power cylinder 3 is driven by the operating fluid supplied from the rotary control valve 1. The differential pressure detecting device 6 detects differential pressure between discharge pressure of the operating fluid supplied from the pump 5 and the higher pressure of cylinder chambers 31 and 32 of the power cylinder 3. The switching valve 2 acts in accordance with the differential pressure, and connects the cylinder chambers 31 and 32 when the steering wheel is substantially not rotated by a driver. The electric control unit 7 regulates the rotational speed of the electric motor 55 in accordance with detection signals of the differential pressure detecting device 6.

Figure 7:
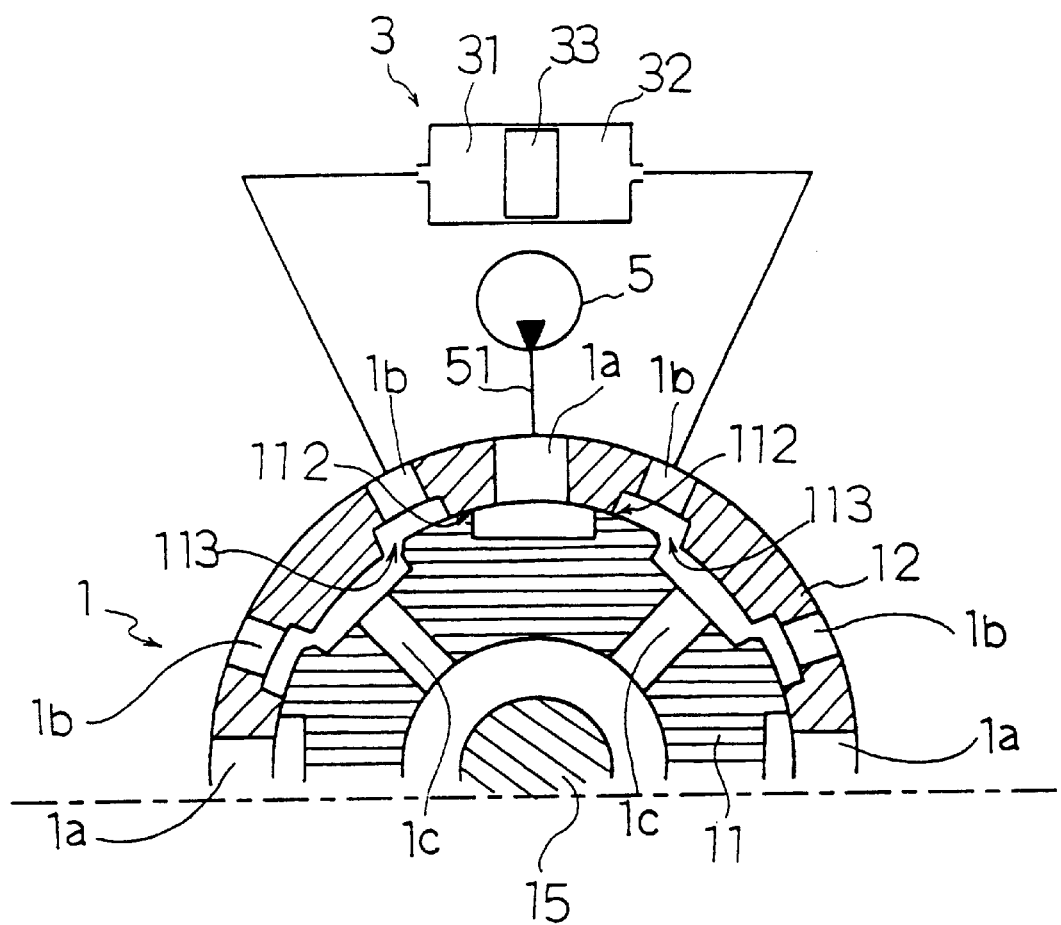
FIG. 7 is a transverse sectional view showing a rotary control valve of the embodiment.

The rotary control valve 1 has a cylindrical structure. As shown in FIG. 7, the rotary control valve 1 includes a valve shaft 11, a valve body 12 and a torsion bar 15. The valve shaft 11 rotates in association with the steering wheel. The valve body 12 coaxially covers the valve shaft 11, and connects with an unillustrated steering linkage assisted by the power cylinder 3. The torsion bar 15 connects the valve shaft 11 and the valve body 12 so as to allow a relative rotation between the valve shaft 11 and the valve body 12 within a certain elastic range.

The valve body 12 includes four sets of ports though an under half of the rotary control valve 1 is not illustrated in FIG.7. An inlet port 1a and two cylinder ports 1b make a set of the ports. One set of ports is mainly described hereinafter because each set of the ports is substantially same. The inlet port 1a locates between the cylinder ports 1b, and connects with the pump 5. The cylinder ports 1b connect with the cylinder chambers 31 and 32, respectively.

Four return ports 1c (two return ports are not illustrated) form in the valve shaft 11 to connect to a reservoir 9. Each return port 1c locates between the cylinder ports 1b relating to the different sets of the ports.

Variable orifices 112 and 113 respectively form between the valve shaft 11 and the valve body 12, so as that the rotary control valve 1 selectively supplies the operating fluid to either of the cylinder chambers 31 or 32 of the power cylinder 3 in accordance with the steering operation. Each of the variable orifices 112 adopts a center-closed-type to prevent the operating fluid from leading to the power cylinder 3 in the vicinity of the neutral position of the steering wheel. In the concrete, a pair of the variable orifices 112 substantially closes the inlet port 1a in the vicinity of the neutral position. At this time, the variable orifices 113 open to connect each of the cylinder chambers 31 and 32 and the reservoir 9 via the cylinder ports 1b and the return ports 1c.

When the driver rotates the steering wheel, one of the variable orifices 112 gradually opens in accordance with the rotation of the steering wheel. At the same time, the variable orifice 113 next to the opening variable orifice 112 gradually closes. Therefore, one of the cylinder chambers 31 and 32 connects to the pump 5 so as to lead the operating fluid, and the other of the cylinder chambers 31 and 32 connects to the reservoir 9 so as to discharge the operating fluid.

The power cylinder 3 includes a power piston 33 dividing one of the cylinder chambers 31 and 32 from the other. A piston rod 35 is fixed on the power piston 33. The piston rod 35 connects to wheels through tie rods not illustrated.

The switching valve 2 locates between the power cylinder 3 and the rotary control valve 1. The switching valve 2 includes a spool 25, a spring 26, side ports 21 and 22, and a cylinder pressure port 23 and a discharge pressure port 24.

The spool 25 includes a first spool head 251 and a second spool head 252. The spring 26 biases the spool 25 in an outer surface of the first spool head 251.

The side ports 21 and 22 locate in a side surface of the switching valve 2. The side port 21 connects to the cylinder chamber 31 of the power cylinder 3. The side port 22 connects to the cylinder chamber 32 of the power cylinder 3.

The cylinder pressure port 23 faces an outer surface of the first spool head 251. The cylinder pressure port 23 introduces the higher pressure (Pa or Pb) of the cylinder chambers 31 and 32 of the power cylinder 3 via a shuttle valve 61 explained hereinafter. The pressure Pa shows the cylinder pressure of the cylinder chamber 31. The pressure Pb shows the cylinder pressure of the cylinder chamber 32.

The discharge pressure port 24 faces an outer surface of the second spool head 252. The discharge pressure port 24 introduces the discharge pressure Po supplied from the pump 5.

Figure 5:
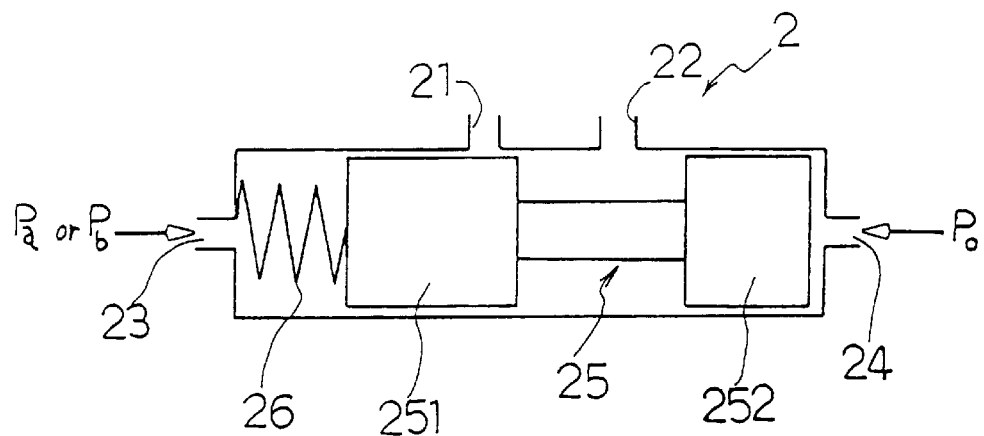
FIG. 5 is a sectional view showing a switching valve of the embodiment under a closing state.

Therefore, the spool 25 moves in responsive to the differential pressure between the discharge pressure Po and the higher pressure (Pa or Pb). When the steering wheel is rotated, since the differential pressure is small, the spool is displaced toward the discharge pressure port 24 by the spring 26, so as that the first spool head 251 closes the side port 21. The displaced spool 25 disconnects the communication between the side ports 21 and 22, as shown in FIG. 5.

Figure 6:
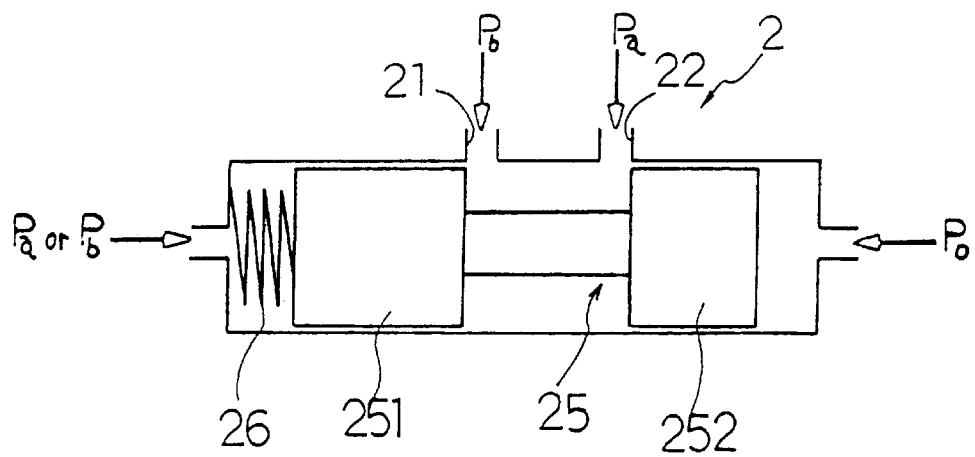
FIG. 6 is a sectional view showing the switching valve of the embodiment under an opening state.

When the rotation of the steering wheel stops, and the valve shaft 11 of the rotary control valve 1 returns to the neutral position of it, the inlet port 1a closes and the cylinder ports 1b connect to the reservoir 9. Therefore, the cylinder pressure Pa and Pb decrease and the discharge pressure Po increases, so as that the differential pressure increases. When the differential pressure exceeds a predetermined amount, the spool 25 moves toward the cylinder pressure port 23 against the spring 26, so as that the first spool head 251 opens the side port 21. This movement connects the communication between the side ports 21 and 22, as shown in FIG. 6.

The differential pressure detecting device 6 includes the shuttle valve 61, a detecting valve 66 and a differential transformer 67, as shown in FIG. 4.

The shuttle valve 61 is able to choose the higher pressure (Pa or Pb) of the cylinder chambers 31 and 32 of the power cylinder 3 because switched by the differential pressure between the cylinder chambers 31 and 32. The higher pressure leads to the cylinder pressure port 23 with displacing a spool of the shuttle valve 61.

The detecting valve 66 has a detecting spool sliding in accordance with the differential pressure between the higher pressure (Pa or Pb) from the shuttle valve 61 and the discharge pressure Po from the pump 5.

The differential transformer 67 acts in accordance with the slide of the detecting spool to give signals (voltage signals) almost inversely proportional to the differential pressure between the higher pressure (Pa or Pb) and the discharge pressure Po.

The electric control unit 7 includes a microcomputer having a microprocessor unit (MPU) or the like as an arithmetic unit. The electric control unit 7 receives the signals of the differential transformer 67 to control the rotational speed and the like of the electric motor 55. Therefore, the operational state of the electric motor 55 changes as follows.

When the steering wheel is substantially not rotated, the discharge pressure Po of the pump 5 extremely increases. The differential transformer 67 detects this increase, and signals the electric control unit 7. The electric control unit 7 lowers the rotational speed of the electric motor 55 to maintain the discharge flow rate of the operating fluid extremely small for energy saving. Otherwise, the electric control unit 7 stops the electric motor 55.

As described above, the embodiment adopts the electric motor 55 as a pump from the point of view of the energy saving in non-rotational state of the steering wheel. However, as is apparent, other types of pumps can be used. For example, a pump driven by an automobile engine can be used.

A pressure relief valve 80 locates between the inlet port 1a of the rotary control valve 1 and the pump 5 to release overpressure of the discharge pressure of the pump 5 to the reservoir 9.

The operation of the power steering apparatus constructed above is described hereinafter. When the steering wheel is rotated, the rotary control valve 1 operates to supply the operating fluid to one of the cylinder chambers 31 and 32 of the power cylinder 3, and to release the operating fluid from the other to the reservoir 9. Rising the pressure of the cylinder chamber introducing the operating fluid, the power piston 33 is displaced toward the lower pressure side. The piston rod 35 connecting to the power piston 33 assists wheels motion via the tie rod or the like.

In this state, since relatively small is the differential pressure between the discharge pressure Po of the pump 5 and the higher pressure (Pa or Pb) of the cylinder chambers 31 and 32, the spring 26 displaces spool 25 to close the side port 21, as shown in FIG. 5. The spool 25 disconnects the communication between the cylinder chambers 31 and 32. Therefore, the operating fluid is continuously supplied to the higher-pressure-side of the power cylinder 3.

When the rotation of the steering wheel is stopped, the rotary control valve 1 connected with the steering wheel closes the inlet port 1a to prevent supplying the operating fluid to the higher-pressure-side of the power cylinder 3. And also, the rotary control valve 1 releases the operating fluid from both of the cylinder chambers 31 and 32 to the reservoir 9 via the cylinder ports 1b and the return ports 1c.

In this state, since the power piston 33 moves toward the neutral position by reaction force from wheels, i.e., self-aligning-torque, via the tie rods. This self-return of the power piston 33 brings restoring force of the steering wheel. This is that self-return-force is input to the steering wheel via the power cylinder 3, so as that the steering wheel returns to the neutral position.

As stated above, when the center-closed-type rotary control valve 1 prevents supplying the operating fluid to the power cylinder 3, the both cylinder chambers 31 and 32 maintain low pressure state. This is that the higher pressure (Pa or Pb) chosen by the shuttle valve 61 even maintains low pressure state. And also, the discharge pressure Po of the pump 5 increases because the inlet port 1a closes in the rotary control valve 1. Therefore, rises the differential pressure between the higher pressure (Pa or Pb) and the discharge pressure Po in the switching valve 2. As shown in FIG. 6, the differential pressure acts to displace the spool 25 against the spring 26 so as to connect the side ports 21 and 22, i.e., to connect the cylinder chambers 31 and 32. The communication between the cylinder chambers 31 and 32 effectively releases the operating fluid from one chamber of higher pressure side to the other of lower pressure side with the above self-return of the power piston 33 of the power cylinder 3. Therefore, the power piston 33 smoothly returns to the neutral position in the power cylinder 3. This brings that the steering wheel returns to the neutral position, smoothly.

In the embodiment described above, because adopting the center-closed-type, the rotary control valve 1 prevents supplying the operating fluid to the power cylinder 3 in vicinity of the neutral position by substantially closing the inlet port 1a. Therefore, the power steering apparatus does not assist the steering operation in vicinity of the neutral position. This means that steering feeling of the driver is similar to that of the manual steering apparatus, so as that rigidity, i.e., strength of stability, of the steering operation is enhanced around neutral position. Therefore, directional stability of the vehicle is also enhanced.

Namely, the power steering apparatus copes with both enhancements that restoring force for the self-return of the steering wheel and the rigidity of the steering operation around neutral position.

In addition, in the embodiment, because the electric motor 5 drives the pump 5 for supplying the operating fluid to the power cylinder 3, the discharge fluid rate is easily controlled according to needs of power-assist by changing the rotational speed of the electric motor 55. Therefore, it is able to reduce the energy consumption. When the power-assist is required under the steering operation, the rotational speed of the pump 5 increases in accordance with the reduction of the differential pressure between the discharge pressure Po of the pump 5 and the higher pressure (Pa or Pb) of the cylinder chambers 31 and 32. On the other hand, When the power-assist is essentially not required under the non-steering operation, the rotational speed of the pump 5 decreases to maintain the discharge flow rate extremely low or the pump 5 stops in accordance with the increase of the differential pressure for the energy saving.

Obviously, numerous modifications and variations of the present invention are possible in light of the above teachings. It is therefore to be understood that within the scope of the appended claims, the present invention may be practiced otherwise than as specifically described herein.

What is claimed is:

1. A power steering apparatus comprising:
   a pump for discharging operating fluid;
   a power cylinder having two cylinder chambers divided by a power piston;
   a control valve for regulating the operating fluid supplied to said power cylinder in accordance with rotation of a steering wheel; and
   a switching valve connecting the cylinder chambers when a discharge pressure of the pump exceeds a higher pressure of said cylinder chambers by a predetermined amount, in order to return the steering wheel toward a neutral position.

2. The power steering apparatus according to claim 1, wherein said switching valve has two side ports respectively connected to the cylinder chambers.

3. The power steering apparatus according to claim 1, wherein said switching valve has a cylinder pressure port introducing a higher one of the pressures of the cylinder chambers.

4. The power steering apparatus according to claim 1, wherein said switching valve has a discharge pressure port introducing discharge pressure of said pump.

5. The power steering apparatus according to claim 1, further comprising a differential pressure detecting device for detecting differential pressure between discharge pressure of said pump and higher pressure of the cylinder chambers.

6. The power steering apparatus according to claim 1, wherein said control valve includes a center-closed-type variable orifice for preventing the operating fluid supply to said power cylinder in the vicinity of the neutral position of the steering wheel.

7. The power steering apparatus according to claim 6, wherein the center-closed-type variable orifice substantially closes an inlet port of said control valve introducing the operating fluid from said pump in the vicinity of a neutral position of the steering wheel.

8. The power steering apparatus according to claim 6, wherein said switching valve has a spool moving in accordance with differential pressure between discharge pressure of said pump and higher pressure of the cylinder chambers.

9. The power steering apparatus according to claim 1, wherein said pump is driven by an electric motor.

10. The power steering apparatus according to claim 9, wherein said electric motor operates in accordance with differential pressure between discharge pressure of said pump and higher pressure of the cylinder chambers.

11. The power steering apparatus according to claim 10, wherein rotational speed of said electric motor is inversely proportional to the differential pressure.

12. A power steering apparatus comprising:
    a pump for discharging operating fluid;
    a power cylinder having two cylinder chambers divided by a power piston;
    a control valve for regulating the operating fluid supplied to said power cylinder in accordance with rotation of steering wheel; and
    a switching valve connecting the cylinder chambers when a discharge pressure of the pump exceeds a higher pressure of said cylinder chambers by a predetermined amount, when power assistance of said power cylinder is substantially not required.

13. A power steering apparatus comprising:
    a pump for discharging operating fluid;
    a power cylinder having two cylinder chambers divided by a power piston, the cylinder chamber connected each other;
    a control valve for regulating the operating fluid supplied to said power cylinder in accordance with rotation of a steering wheel; and
    a switching valve disconnecting the cylinder chambers when a discharge pressure of the pump exceeds a higher pressure of said cylinder chambers by less than a predetermined amount to activate said power cylinder.

* * * * *